Dec. 29, 1925.

J. E. CALVERLEY ET AL

CONVERTING AND TRANSFORMING ELECTRIC CURRENTS

Filed Dec. 13, 1921

INVENTORS
John Earnshaw Calverley,
William Eden Highfield,

Dec. 29, 1925.  1,567,032

J. E. CALVERLEY ET AL

CONVERTING AND TRANSFORMING ELECTRIC CURRENTS

Filed Dec. 13, 1921  4 Sheets-Sheet 2

INVENTORS

Dec. 29, 1925.

J. E. CALVERLEY ET AL 1,567,032

CONVERTING AND TRANSFORMING ELECTRIC CURRENTS

Filed Dec. 13, 1921

Dec. 29, 1925.  
J. E. CALVERLEY ET AL  
1,567,032  
CONVERTING AND TRANSFORMING ELECTRIC CURRENTS  
Filed Dec. 13, 1921  4 Sheets-Sheet 4

Fig.8.

INVENTORS

Patented Dec. 29, 1925.

1,567,032

UNITED STATES PATENT OFFICE.

JOHN EARNSHAW CALVERLEY, OF PRESTON, AND WILLIAM EDEN HIGHFIELD, OF LONDON, ENGLAND, ASSIGNORS TO THE ENGLISH ELECTRIC COMPANY, LIMITED, OF LONDON, ENGLAND.

CONVERTING AND TRANSFORMING ELECTRIC CURRENTS.

Application filed December 13, 1921. Serial No. 522,073.

*To all whom it may concern:*

Be it known that we, JOHN EARNSHAW CALVERLEY and WILLIAM EDEN HIGHFIELD, subjects of the King of England, residing respectively, in Ribbleton, Preston, Lancashire, England, and London, England, have invented certain new and useful Improvements in Converting and Transforming Electric Currents, of which the following is a specification.

This invention deals with the conversion of alternating current from a polyphase system of one number of phases to another polyphase system of a different number of phases.

Primarily the invention is intended for application to apparatus for converting from alternating current to direct current or vice versa or from direct current of one voltage to direct current of another voltage in accordance with a method of which examples are given by the specifications of our Patent Application No. 369,001 filed March 26th, 1920, and United States Patent No. 1,366,057 of January 18, 1921. Such apparatus involves the combination with phase converting means of commutating gear connected with one of the polyphase systems. The invention has particularly in view the overcoming of obstacles to good commutation which have been found to exist in conversion apparatus of this kind. Stated generally, the cause of these difficulties may be said to be lack of balance or uniformity of the fluxes with which are linked different sections of the windings of the polyphase system to which the commutating gear is connected and accordingly the difficulties may be removed by the use of means for the maintaining of balance or uniformity of these fluxes.

In apparatus of the kind indicated, a number of transformers are employed having at least two sets of windings which may for convenience be distinguished by the terms primary and secondary. Two possible general schemes of constructing these polyphase transforming arrangements may be distinguished. In one of these a comparatively small number of transformer cores may be employed, the correct phase relationship between the sections of the primary and secondary windings being obtained by combining in each section an appropriate number of turns taken from two or more cores. In the other type of arrangement, a large number of cores are employed each having a flux produced in it of a phase differing from the phases of the other cores by an appropriate combination of exciting windings taken from the phases of one of the systems. With such an arrangement the result can be obtained that each phase of the system containing the larger number of phases can have a core appropriated to itself so that the winding of each phase of that system consists of the same number of turns as each of the others and in each case is located on a single core. These similar sections are interconnected to form a closed ring winding having connections taken at appropriate distances round the ring to the segments of a commutator between which and suitable brush gear relative motion is produced by a synchronous motor as indicated in the specifications of our application and patent hereinbefore mentioned. This second type of arrangement has important practical advantages but affords an opportunity for the occurrence of the difficulties in the way of commutation referred to hereinbefore. This is due to the fact that one winding (primary or secondary) on some of the cores is formed of two parts connected in different phases and there is a possibility that the magnetization or load may not be borne in the correct proportion by the said two parts and particularly if the winding elements of a single phase which are distributed over several cores are connected in series there is a possibility that these elements may not share either the magnetization or the load between themselves in the correct proportions. It is to the correction of this want of balance that the present invention is primarily directed with the object of enabling the commutation gear to work in a satisfactory manner.

The difficulties in the way of commutation are of two kinds. The first follows from the lack of balance or uniformity of fluxes just referred to caused by the method of arranging the windings. The second appears to be due to the combined effects of saturation of the cores of the transformers and the difference between the wave shapes of the alternating current and the commutated direct current which flow in the two sets of windings (primary and secondary) on each core. The effect of the first of these causes is to upset the voltage distribution around the commutator so that the volts between adjacent segments reach abnormal values and the commutation zone, that is the region where the potential passes through zero value, is unstable and does not maintain a constant relation to the brush position. These effects are noticeable mainly at light loads when the magnetizing current forms an important part of the total current flowing through the windings. The result of the second cause above mentioned is to produce a progressive movement of the commutation zone as the load increases so that it is necessary to adjust the brush position as the load varies in order to obtain satisfactory commutation. This effect is of course similar in its outward appearance to the effect which occurs in certain direct current generators and motors notably those not provided with commutation poles. The causes are, however, entirely different in the two cases as will be obvious from a consideration of the essential differences between the construction and method of working of the two types of apparatus.

To overcome the difficulties of the two kinds, two sets of additional windings are applied to the cores of the transformers by means of which the converting apparatus is built up. These additional windings are spoken of hereafter as "balancing windings."

In producing the balancing windings of the first set we arrange supplementary coils on a set of cores to form a closed circuit and select the numbers of turns in the various coils so that the E. M. F.'s induced in the closed circuit under balanced conditions of magnetization (that is, correct flux magnitude and phase in each core) have zero resultant while if other conditions exist the resultant E. M. F. causes current to flow around the circuit in such a direction as to produce magnetizing and demagnetizing effects on the respective cores, these effects being so distributed and proportioned as to act towards the production of balanced conditions.

To produce a close approximation to the balanced state it appears necessary to have some feature which provides a controlling influence prescribing a standard towards which the adjustment of flux values must advance. This feature may be provided in two ways. The first of these consists in establishing a direct relation between one or more elements of a closed circuit of the balance winding and the conditions in a part of one of the main winding systems of which the E. M. F. is generally fixed in magnitude and phase by influences acting external to the transformer. The second method consists in forming the balance winding into several closed circuits and so interconnecting these electrically and also preferably magnetically that they may form by themselves a symmetrical system tending to produce balanced conditions.

In many cases the best result can be obtained by combining the two methods.

Under the conditions in view for the application of this invention, it will generally be preferable to employ a set of polyphase transformers rather than single phase transformers. This fact will provide for the magnetic interconnection of the balance windings above referred to by arranging that the balance coils on the several cores of a single polyphase transformer are connected into different elementary closed circuits which are connected electrically to form the balance windings. If for any reason it were desirable to use single phase transformers, the equivalent of magnetic interconnection could also be attained in that case through the agency of currents circulating in the balance windings, by connecting several elementary circuits of the balance winding coils on the same core.

In the converting apparatus of the type set out in the specifications of our application and patent previously mentioned, additional tendencies towards disturbance of the fluxes in the individual cores are introduced as hereinbefore mentioned by the fact that the current in one set of windings is required to be alternating current of ordinary type while the current in the other set of main windings is a commutated direct current. Owing to this condition, as well as to effects due to saturation of the cores of the polyphase transformers, currents of higher frequency than the fundamental are required to flow to maintain the balance of ampere turns on the cores. In view of this, balance windings of the second set are provided. These windings are in separate elements each confined to its own polyphase transformer and linked with each one of the cores of that transformer and forming a closed mesh which provides a low impedance path for balancing currents of the kind indicated. In the absence of such a path, corresponding currents would circulate in the other windings and would result in the production of undesirable distortion of the flux wave form accompanied by a corresponding change of shape of the E. M. F. wave which in turn will introduce difficulties in commutation as hereinbefore mentioned, which may be accomplished by a variation in the ratio of transformation.

The closed mesh winding linked with the cores of a transformer will also have the effect of providing for the maintenance of a balance between the actions of the separate cores of that transformer so that the same effective value of E. M. F. is produced in the windings of each one of them, since, if there were flux conditions corresponding to a want of balance of this kind, circulating currents of fundamental or harmonic frequency would be produced resulting in a restoration of the balance.

The invention will be further discussed by reference to the accompanying drawings which deal with the same case where one of the main winding systems is a three phase system and the other is a system of thirty six phases adapted to form a closed ring winding which is connected to commutating gear, as and for the objects set out in the specifications of our application and patent previously referred to. The conversion between the two systems is effected by the intermediary of a number of three phase transformers which are independent of each other magnetically. For convenience of description, the three phase system will be spoken of as the primary and the other system will be spoken of as the secondary.

Figure 1:
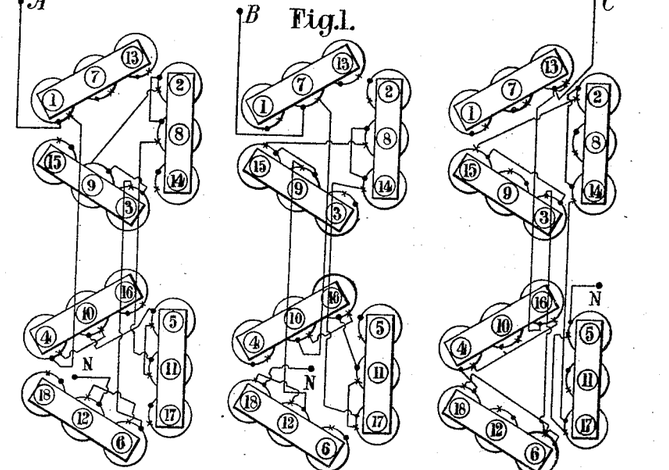
Figure 1 is a diagram indicating the arrangement of the primary windings of the polyphase transformers.
Figure 2:
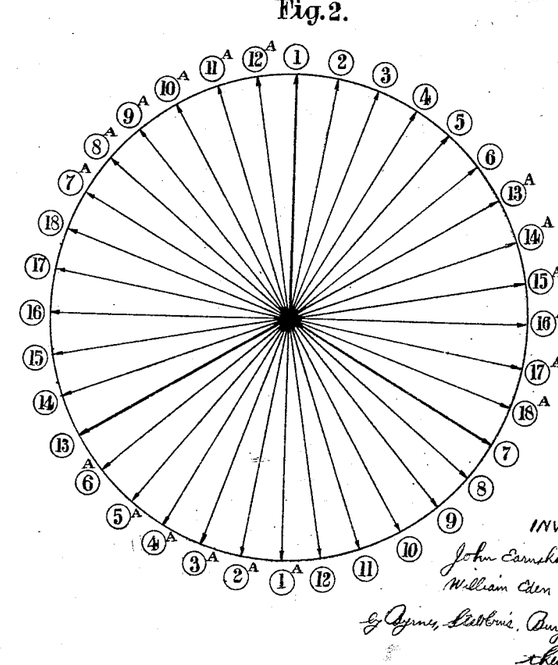
Figure 2 is a vector diagram indicating the phase relationship of the currents produced in the secondary windings on the various cores. This also shows the phase relationship of the fluxes in the cores.
Figure 7:
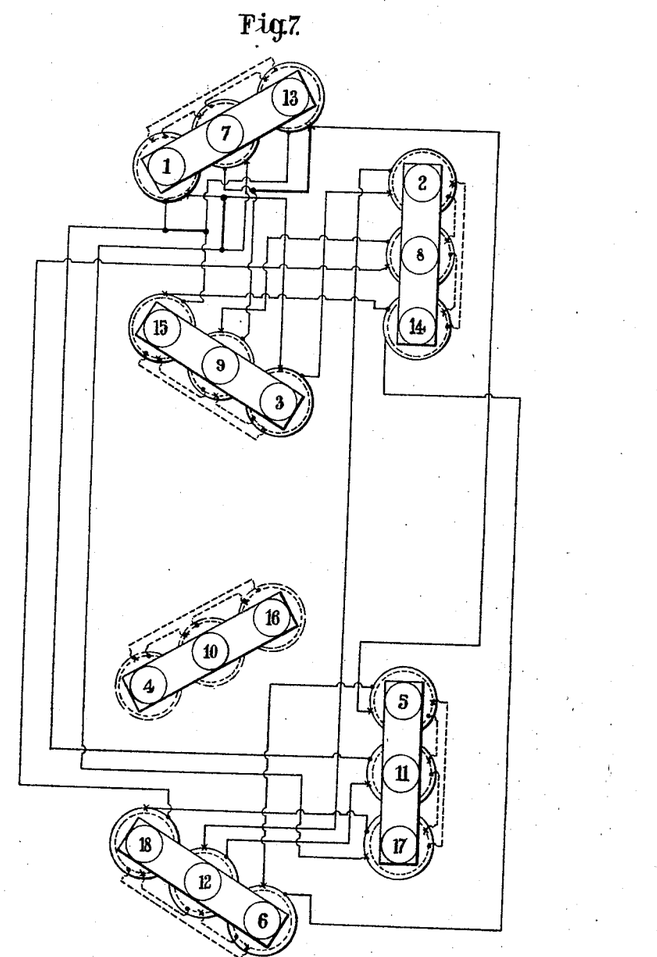
Figure 7 is a diagram similar to Figure 1 indicating the arrangement of the balancing windings on the polyphase transformers.
Figure 8:
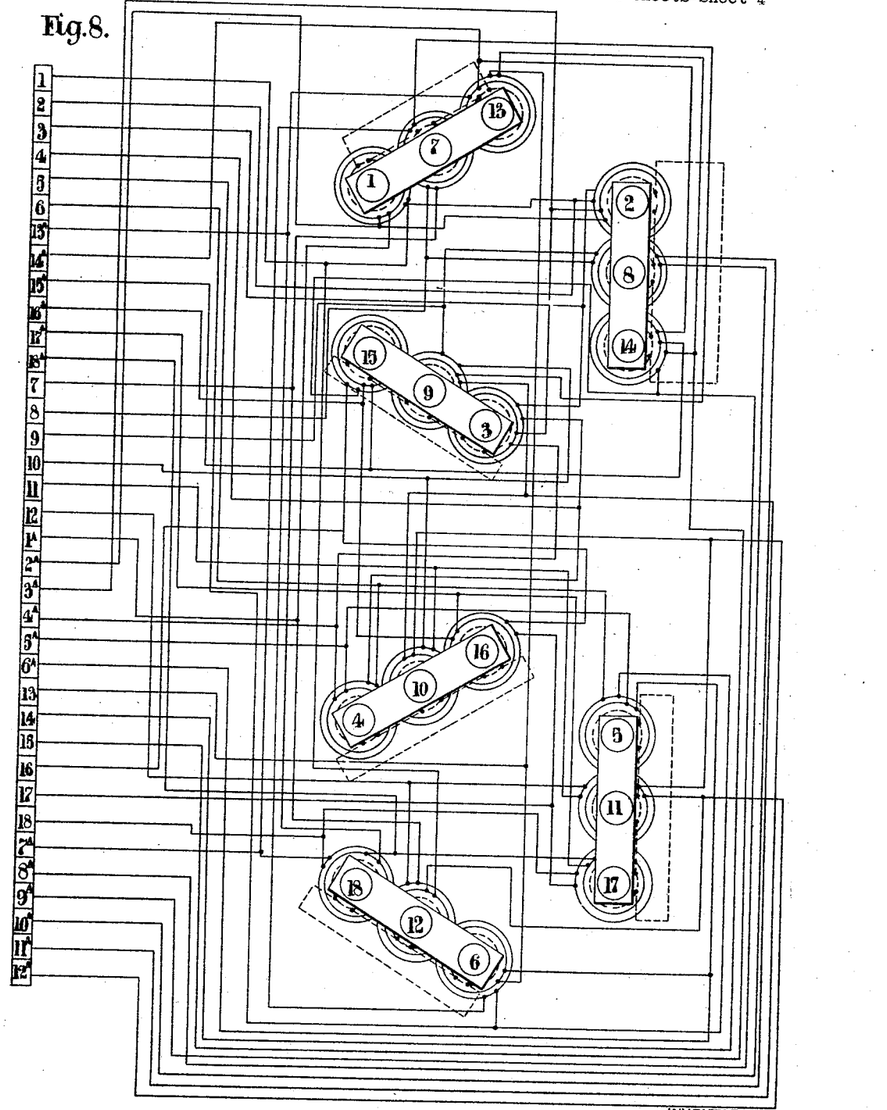
Figure 8 is a diagram indicating the arrangement of that set of balance windings, each member of which forms a closed mesh linked with each of the cores of one of the polyphase transformers and with those cores only, in conjunction with the secondary windings which are interconnected and joined to the segments of a commutator.

To form a complete representation of a converting apparatus embodying the present invention, it will be necessary to superimpose the three diagrams of Figure 1 and Figures 7 and 8. Obviously this is not practicable but the assumption of superposition is to be made in order that the form of the apparatus as a whole may be recognized. In these drawings the numbers 1 to 18 (enclosed in circles) and these numbers with the index letter A are used to indicate the thirty six phases of the secondary winding, the relationship of these phases being shown on Figure 2. These two sets of numbers are also used in connection with the commutator segments shown in Figure 8 in a manner hereinafter indicated and the numbers 1 to 18 are also used in Figure 2 and elsewhere to indicate the cores of the transformers on which the corresponding secondary phase windings are located. These eighteen cores are comprised in six 3-phase transformers which are shown in diagrammatic plan on Figure 1, being repeated three times in that figure so as to indicate in each of the three diagrams the path of the current of one of the three primary phases. This path in each instance extends from the terminal at the top marked A, B and C respectively through windings connected in series and arranged on eleven of the cores to the neutral point indicated by N. It will be clear that the primary windings of any one of the transformers must be so arranged as to give a three phase relationship between the fluxes at its cores. This can be done by an appropriate selection of the number of turns from the different primary phases to be applied to each core. No attempt is made in the accompanying diagrams to indicate the number of turns of the primary winding. It will be seen that the three phase transformer containing the cores 1, 7 and 13 is provided with a single primary winding on each core, and of the other transformers each has the primary winding formed of two sections from different phases. The primary windings of the different cores are shown connected in series between the points A, B and C respectively and the neutral N but it will be understood that connection may be made in parallel or in a combination of series and parallel. This connection in itself is not sufficient to ensure balanced conditions in the secondary system. This latter system will comprise two coils or sets of coils taken from each core, these two parts being arranged to have opposite phases so as to obtain thirty-six phases from the eighteen cores. The two phases taken from a single core are indicated in Figure 2 by the number of the core, in one case used alone and the other with the index A. The complete secondary system forms a closed ring winding consisting of thirty-six sections distributed on eighteen cores and connected to the segments of a commutator as indicated in Figure 8. In that figure it is shown that each of the junctions between the sections is connected to a segment of the commutator which is set out in the diagram as a straight line development. Each segment of the commutator is numbered to correspond with one of the two coils with which it is directly connected so that the numbers of the segments follow the same sequence as the numbers around the outside of the vector diagram forming Figure 2. Any out of balance either in phase or magnitude of the E. M. F.'s in the various sections may give rise to a circulating current and produce commutation difficulties.

Figures 3, 4, 5, 6:
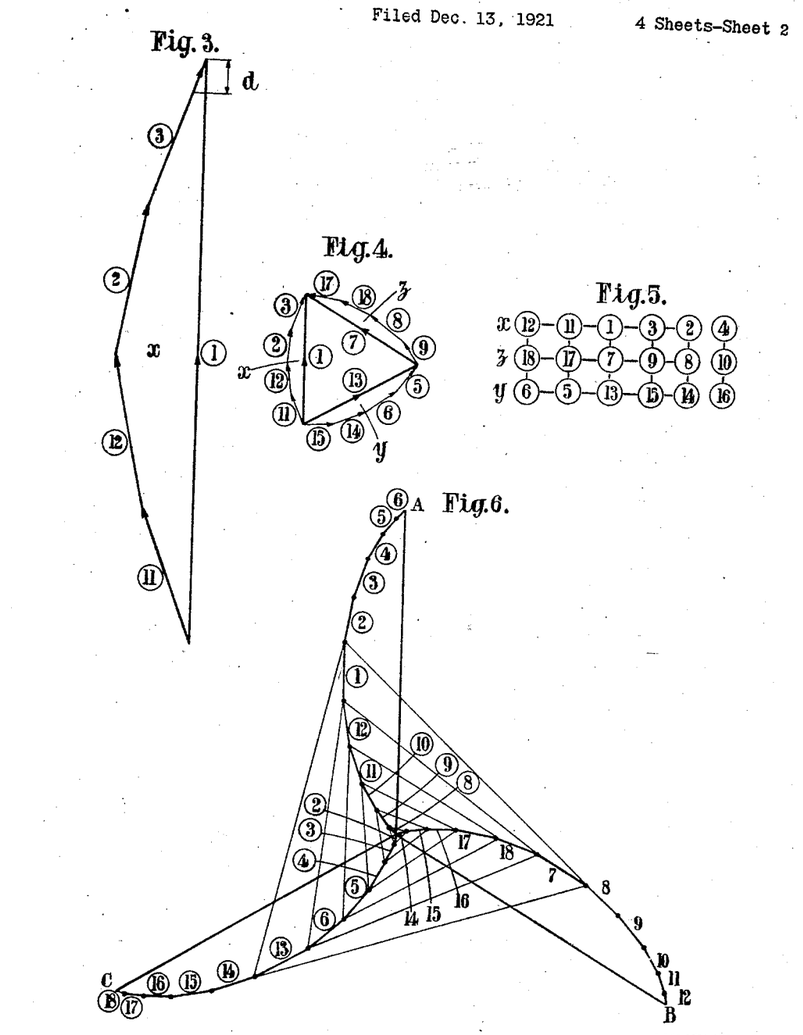
Figure 3 is a vector diagram of a circuit of the balance winding.
Figure 4 is a vector diagram of three connected circuits of the balance winding and Figures 5 and 6 are diagrams used to explain the interlinking of the cores electrically and magnetically.

As previously indicated the balance winding is divided preferably into a number of elementary circuits and a convenient arrangement is one in which the number of these circuits is the same as the number of the primary phases. Each of these circuits should preferably be so formed that the vectors representing the E. M. F. generated in it in balanced conditions form a closed polygon considerably greater in length than in width, the vectors being in two oppositely directed sets which produce no resultant. This arrangement is illustrated by Figure 3 which deals with the case of a closed circuit of the balance winding linked with cores 1, 2, 3, 11 and 12, the number of turns on each core being such that under balanced conditions the figure is closed and has no resultant. The advantage of an arrangement of this kind will be recognized if an unbalanced case be considered. Take, for instance, as an example, conditions such that the E. M. F. generated in the balance winding on core 1 is shorter by the amount $d$ than the vector sum of the E. M. F.'s in cores 11, 12, 2 and 3. Under these circumstances, an E. M. F. determined by the length $d$ will cause a current to circulate, the E. M. F. being in opposition to that produced in the balance winding on core 1 and the current being practically wattless, thus current will lead on the E. M. F. in the balance winding on core 1 by approximately 90° and will therefore magnetize this core. At the same time, the effect of this circulating current in the windings on the other cores will be demagnetizing since the E. M. F.'s in the balance windings of the cores 11, 12, 2 and 3 are almost in opposition of phase to that in the balance winding on core 1. Accordingly, this current will have the effect of increasing the flux in one set of cores and decreasing it in the other set in such a way as to tend to close the polygon.

It will be noted that the arrangement indicated in Figure 3 has the characteristic that one side of the figure, namely, that indicated by 1, is considerably greater in length than any of the others and is directed in a sense substantially opposite to the others. For the production of this characteristic it is necessary that the coil on core 1 should contain a considerably larger number of turns than each of the coils on cores 2, 3, 11 and 12. It is further to be noted that this winding 1 is located on one of the cores which carries a single primary winding only. By this means, the balance coil on core 1 is put in direct relation with the primary phase and is also the principal determining factor in fixing the phase and magnitude of the E. M. F.'s in the closed circuit of the balance winding. The method of connection indicated should be extended so as to provide three elementary balance circuits each of which is put in direct relation with one of the primary phases. These three circuits can then be interconnected so as to form a delta connection, each side of which consists of one of the circuits. The method by which this is effected is shown in Figure 4 where the circuit indicated by X is taken from Figure 3 and is combined with two other circuits indicated by Y and Z, similar to circuit X both in form and in relation to a primary phase. By this interconnection of the elementary circuits, a symmetry is established within the balance system itself so that we have both the direct relationship to the primary circuit and inherently symmetrical tendencies to co-operate in establishing a balance.

The arrangement indicated by the vector diagrams of Figures 3 and 4 is shown by the diagram of connections in Figure 7 which is a diagrammatic plan view of the six 3-phase transformers shown in Figure 1 but giving only the connections of the balance windings. The three elementary circuits X, Y and Z of Figure 4 are indicated by the full lines including the outside circles round the respective cores. These three elementary circuits are shown interconnected by the three heavy lines in the upper part of the figure. In this diagram as in Figure 1, the "start" and "finish" of each winding are indicated respectively by a dot and a cross on the circle.

In distributing the windings of the balance system amongst the elementary circuits, it appears advisable generally to avoid including in any one of these circuits coils on two cores of the same transformer for the reason that the difference of phase of the fluxes in such cores is considerable and in consequence the circulating currents in the balance winding are not so effective in providing magnetizing forces to correct any want of balance as they are for example in the case of Figure 3 where the flux vectors in balanced conditions form a closed polygon considerably greater in length than in width, the vectors being in substantially two oppositely directed sets so that substantially the whole of any circulating current is effective in producing magnetizing forces in the respective core limbs to either magnetize or demagnetize the cores as may be necessary to produce a balance.

Reference to Figure 5 will indicate the method of linking up the various cores of the transformers by balance windings. The vertical lines in that figure connect the cores which are parts of a single transformer. The horizontal lines indicate an electrical linkage between cores effected by the balance winding, each set of five cores so connected forming one of the elementary balance circuits X, Y or Z of the balance winding. It will be noted that the transformer comprising cores 4, 10 and 16 is not linked by any one of the balance windings X, Y or Z and it will be seen that there is no objection to the omission of a single transformer in this way in order to get a close approximation to balanced conditions in the secondary winding. This is due to the fact that the balance of the whole system is determined by the voltage applied to the primary terminals which under normal conditions will be correct in magnitude and phase while the balance of the interlinked transformers will be secured by the balance winding. The conditions in the single transformer omitted from linkage with the balance windings may therefore be regarded as determined by the difference between two sets of balanced conditions, which difference will itself be balanced. The magnetic interlinking of the three phases of that transformer combined with the action of the primary windings which are distributed on all the transformers and the balance winding which is distributed on all but one, will result in the balancing effect being extended to the transformer which is omitted from the actual balance windings.

The magnetic interlinking between cores may be supplemented advantageously and other results previously indicated may be secured by providing on each polyphase transformer or on some of them a closed circuit winding linked with all the cores of the transformer. This may have the form of a single turn on each core, the three turns being connected to form a closed mesh. Such a closed circuit winding on each transformer is shown diagrammatically by the dotted circles and interconnecting lines on Figure 7. With such an arrangement applied to each of the six transformers in the example under discussion, the vertical lines in Figure 5 may be taken to indicate an interlinking effected by this additional winding.

One function of this winding is as previously indicated to provide a path of low impedance for currents of a higher frequency than the fundamental which are required to flow in order that there may be the requisite approach to balance of ampere turns on the cores.

Another function of this additional winding, also previously indicated, is the maintenance of a balance between the actions of the separate cores so that the effective value of the E. M. F. produced by the action of each one of them is the same.

The balanced conditions which it is desirable to obtain are indicated as regards the primary windings by Figure 6 which may also show the manner in which the additional windings contribute to this balancing. In this figure, the primary phases may be indicated by the straight lines drawn from the centre of the figure to the points A, B and C respectively. As previously indicated, the primary winding of each phase is distributed over eleven cores, the number of turns of any phase on a core being so adjusted that, in conjunction with the turns of the other primary phase on that core, they will under balanced conditions produce a flux of the same value in each core, and of correct phase relationship. The numbers applied to the small vectors which form a chain connecting the centre point of the figure with the points A, B and C indicate the component fluxes produced by the respective phases in the cores bearing those numbers, and it will be noted that if any three vectors similarly situated in the three sets be taken, they bear the numbers of cores which are built into a single transformer. Take, for instance, the three small vectors at the centre of the figure. It will be seen that they bear the numbers 8, 2 and 14. It will also be noted that with the exception of 7, 1 and 13, the numbers appear twice on the figure. This is, of course, due to the fact that with the exception of the cores indicated, the flux in each instance consists of two components produced by different primary phases. It will also be noted that similarly situated vectors on each side are at 120° to each other and are equal in magnitude. Accordingly, the points of corresponding vectors may be joined by the sides of triangles, which triangles in each instance are equi-lateral. The additional windings may be regarded as having as one of their functions the maintenance of an approximation to equality in the sides of these triangles. In order to avoid confusion of lines the sides of the triangles have only been drawn for a part of the figure.

Although one particular form of balance winding has been dealt with in considerable detail, it is to be understood that this detailed description is given by way of example and that the application of the invention is not limited thereto.

We declare that what we claim as our invention is as follows:—

1. Apparatus for converting alternating current from a polyphase system of one number of phases to another polyphase system of a different number of phases, comprising transformer cores greater in number than the number of phases of the system having the smaller number of phases, windings on each of said cores connected in each of the systems, some of the said cores having on each of them windings connected in two of the phases of the system having the smaller number of phases, electrical means interlinking said cores in groups with each group containing a number of cores greater than the number of phases in the system having the smaller number of phases, said interlinking means comprising windings additional to the windings of the two systems previously mentioned and serving to maintain an approximation to a constant relation between the effective values of the fluxes in the cores.

2. Apparatus for converting alternating current from a polyphase system of one number of phases to another polyphase system of a different number of phases, comprising transformer cores greater in number than the number of phases of the system having the smaller number of phases, windings on each of said cores connected in each of the systems, some of the said cores having on each of them windings connected in two of the phases of the system having the smaller number of phases, supplementary coils one on each of some of the cores connected to form a closed circuit comprising a number of coils less than the number of cores and greater than the number of phases of the system having the smaller number of phases in which circuit there is zero resultant emf under balanced flux conditions in the cores linked by it and in which a current circulates if these conditions do not exist.

3. Apparatus for converting alternating current from a polyphase system of one number of phases to another polyphase system of a different number of phases, comprising transformer cores greater in number than the number of phases of the system having the smaller number of phases, windings on each of said cores connected in each of the systems, some of the said cores having on each of them windings connected in two of the phases of the system having the smaller number of phases, and others of the said cores each being linked with a single phase of said system, a supplementary coil on each of a number of the cores greater than the number of phases in the system having the smaller number of phases but less than the total number of cores, said coils being connected to form a closed circuit in which there is zero resultant emf under balanced flux conditions in the cores linked thereby and in which a current circulates if these conditions do not exist, one coil in the said closed circuit being on one of the cores linked with a single phase of the system having the smaller number of phases.

4. Apparatus for converting alternating current from a polyphase system of one number of phases to another polyphase system of a different number of phases, comprising a relatively large number of transformer cores, windings on each of said cores connected in each of the systems, some of the said cores having on each of them windings connected in two of the phases of the system having the smaller number of phases, and supplementary coils on some of the cores connected to form a plurality of closed circuits joined together to form a symmetrical system in which in any of its closed paths there is zero resultant emf under balanced flux conditions in the cores linked with the said system and in which currents circulate if these conditions do not exist.

5. Apparatus for converting alternating current from a polyphase system of one number of phases to another polyphase system of a different number of phases, comprising a relatively large number of transformer cores, windings on each of said cores connected in each of the systems, some of the said cores each being linked with two of the phases of the system having the smaller number of phases and others of said cores each being linked with a single phase of said system, and supplementary coils on some of the cores connected to form a plurality of closed circuits joined together to form a symmetrical system in which in any of its closed paths there is zero resultant emf under balanced flux conditions in the cores linked with the said system and in which currents circulate if these conditions do not exist, one coil in each of the said closed circuits being on a core linked with a single phase of the system having the smaller number of phases.

6. Apparatus for converting alternating current from a polyphase system of one number of phases to another polyphase system of a different number of phases, comprising a relatively large number of transformer cores, windings on each of said cores connected in each of the systems, some of the said cores having on each of them windings connected in two of the phases of the system having the smaller number of phases, supplementary coils on some of the cores connected to form a plurality of closed circuits joined together to form a symmetrical system in which in any of its closed paths there is zero resultant emf under balanced flux conditions in the cores linked with the said system and in which currents circulate if these conditions do not exist, and magnetic interconnecting means between cores on which are located supplementary coils in the different closed circuits so that the said circuits are joined together magnetically as well as electrically.

7. Apparatus for converting alternating current from a polyphase system of one number of phases to another polyphase system of a different number of phases, comprising a relatively large number of transformer cores, windings on each of said cores connected in each of the systems, some of the said cores having on each of them windings connected in two of the phases of the system having the smaller number of phases, and supplementary coils on some of the cores connected to form a closed circuit in which the vectors representing the generated emf's under balanced flux conditions form a closed polygon considerably greater in length than in width, the vectors being in two oppositely directed sets which produce no resultant under the said conditions but which cause a current to circulate if these conditions do not exist, said current being of such a phase as to increase the vectors on one side of the polygon and to decrease the vectors on the other side so as to re-establish an approximation to balanced conditions.

8. Apparatus for converting alternating current from a polyphase system of one number of phases to another polyphase system of a different number of phases, comprising a relatively large number of transformer cores, windings on each of said cores connected in each of the systems, some of the said cores having on each of them windings connected in two of the phases of the system having the smaller number of phases, and supplementary coils on some of the cores connected to form a closed circuit in which the vectors representing the generated emfs under balanced flux conditions form a closed figure of which one vector is considerably greater than any of the others and is directed in a sense substantially opposite to the majority of the others so that there is zero resultant emf under balanced flux conditions but there is an emf causing a current to circulate in the said closed circuit if balanced conditions do not exist, said current having the effect of changing the lengths of the long vector and the other said vectors in opposite senses so as to produce an approximation to balanced conditions.

9. Apparatus for converting alternating current from a polyphase system of one number of phases to another polyphase system of a different number of phases, comprising a relatively large number of transformer cores, windings on each of said cores connected to each of the systems, some of the said cores each being linked with two of the phases of the system having the smaller number of phases and others of said cores each being linked with a single phase of said system, and supplementary coils on some of the cores connected to form a closed circuit in which the vectors representing the generated emf's under balanced flux conditions form a closed figure of which the vector representing the coil located on a core which is linked with a single phase of the system having the smaller number of phases is considerably greater than any of the others which represent the coils on the cores linked with two of the phases of the system having the smaller number of phases and is directed in a sense substantially opposite to the others so that there is zero resultant emf under balanced flux conditions but if these conditions do not exist there is an emf causing a current to circulate in such a sense as to bring about an approximation to balanced conditions.

10. Apparatus for converting alternating current from a polyphase system of one number of phases to another polyphase system of a different number of phases, comprising a number of polyphase transformers each having the same number of cores as the number of phases in the system having the smaller number of phases, windings on each of said cores connected in each of the systems, some of said cores having on each of them windings connected in two of the phases of the system having the smaller number of phases, supplementary coils on one core of each transformer of a group of polyphase transformers, said coils being connected to form a closed circuit, and further supplementary windings on a transformer of said group, said further windings being connected to form a closed circuit linking all the cores of the said transformer.

11. Apparatus for converting alternating current from a polyphase system of one number of phases to another polyphase system of a different number of phases, comprising a plurality of polyphase transformers the cores of which carry windings connected in each of the systems and supplementary windings, the windings of the system having the larger number of phases being connected together to form a closed ring from which tappings are taken to a commutator, the supplementary windings forming for each transformer a closed circuit linked with all the cores thereof and providing a path of low impedance for currents of higher frequency than the fundamental of the systems and thereby relieving the said ring winding of such currents and facilitating commutation of the current in said ring winding.

12. Apparatus for converting alternating current from a polyphase system of one number of phases to another polyphase system of a larger number of phases and commutating this second current comprising a relatively large number of transformer cores, windings on each of said cores connected in each of the systems, some of the said cores having on each of them windings connected in two of the phases of the system having the smaller number of phases, a commutator connected with the windings of the system having the larger number of phases, which windings are joined together to form a closed ring, electrical means comprising additional coils arranged in a closed circuit interlinking some of the said cores for maintaining approximately constant the form of the distribution of voltage around the commutator.

13. Apparatus for converting alternating current from a polyphase system of one number of phases to another polyphase system of a larger number of phases and commutating this second current comprising a plurality of three phase transformers connected in each of the systems, a commutator connected with the windings of the system having the larger number of phases which windings are joined together to form a closed ring, supplementary windings on each core, said supplementary windings forming for each transformer a closed circuit linked with all the cores thereof and providing a path of low impedance for currents of higher frequency than the fundamental of the systems thereby relieving the said ring winding of such currents and facilitating commutation of the current in the said ring winding without change of relative brush position on the commutator as the load varies.

In testimony whereof we have signed our names to this specification.

JOHN EARNSHAW CALVERLEY.
WILLIAM EDEN HIGHFIELD.